(12) United States Patent
Li et al.

(10) Patent No.: US 8,410,652 B2
(45) Date of Patent: Apr. 2, 2013

(54) MOTOR ASSEMBLY USING POLAR ANISOTROPIC RING MAGNET

(75) Inventors: Chih-Yung Li, Nan Tou Hsien (TW); Kuo-Shu Hsu, Nan Tou Hsien (TW)

(73) Assignee: Headline Electric Co., Ltd., Nan Tou Hsien (TW)

( * ) Notice: Subject to any disclaimer, the term of this patent is extended or adjusted under 35 U.S.C. 154(b) by 79 days.

(21) Appl. No.: 13/085,494

(22) Filed: Apr. 13, 2011

(65) Prior Publication Data

US 2012/0262011 A1 Oct. 18, 2012

(51) Int. Cl.
*H02K 21/12* (2006.01)
*H02K 7/10* (2006.01)

(52) U.S. Cl. .................. 310/156.01; 310/43; 310/156.12

(58) Field of Classification Search .............. 310/43, 310/152, 156.01, 156.08, 156.12–156.13, 310/156.26, 156.72, 156.78, 216.124, 261.1
See application file for complete search history.

(56) References Cited

U.S. PATENT DOCUMENTS

| 3,293,470 | A | * | 12/1966 | Polgreen | 310/178 |
| 5,306,123 | A | * | 4/1994 | Day et al. | 417/423.7 |
| 2002/0171323 | A1 | * | 11/2002 | Brahmavar et al. | 310/261 |
| 2008/0313884 | A1 | * | 12/2008 | Jeung | 29/598 |

FOREIGN PATENT DOCUMENTS

JP 56117567 A * 9/1981

* cited by examiner

*Primary Examiner* — Tran N. Nguyen
*Assistant Examiner* — Jose Gonzalez Quinones
(74) *Attorney, Agent, or Firm* — Leong C. Lei

(57) ABSTRACT

The rotor assembly contains a number of polar anisotropic ring magnets sequentially stacked, a number of supporting rings within the stacked ring magnets, and an axle threading through the supporting rings. The ring magnets are of a same diameter and length. Each supporting ring contains three co-centric rings: an inner steel ring, a middle rubber ring, and an outer steel ring. The supporting rings are positioned with substantially equal spacing and with a gap away from each aperture of the stacked ring magnets, so that additional weight elements could be positioned and adhered within the gap. The periodic positioning of a number of supporting rings could significantly reduce the weight of the motor assembly with much improved steadiness. Additionally, the middle rubber rings of the supporting rings provide a buffer mechanism for absorbing vibration and noise reduction.

3 Claims, 4 Drawing Sheets

MOTOR ASSEMBLY USING POLAR ANISOTROPIC RING MAGNET

TECHNICAL FIELD OF THE INVENTION

The present invention is generally related to motors, and more particularly to a rotor assembly for motors capable of achieving reduced noise and vibration.

DESCRIPTION OF THE PRIOR ART

Conventionally, a number of magnets are tiled along the circumference of a motor's rotor assembly as shown in FIG. 6 and, in order to provide paths for the magnetic flux, some magnetic conducting device is required. In U.S. Pat. No. 6,408,502 and especially for rotors requiring a large diameter, silicon steel plates are stamped into circular ring plates and the ring plates are stacked into a tubular object. The length of the tubular object is dependent on the required length for the rotor. Inside the two end of the tubular object, two terminal pieces having anti-vibration rubber rings are fixedly installed by welding. Then, magnets are tiled around the circumference of the tubular object with the help of appropriate fixtures. During the foregoing manufacturing process, one of the most difficult issues is to achieve true circular inner and outer surfaces of the magnets. Similarly, the terminal pieces are also required to be truly circular. As such, the rotor is able to spin with high reliability and reduced noises. However; this is not an easy task to achieve. For example, the rubber rings in the terminal pieces are of concern regarding its rotational steadiness and safety, and therefore are not widely applied. In addition, to achieve the required precision and stability additional fixtures are inevitably and thereby production cost is difficult to reduce. This is especially true for the manufacturing of large motors.

SUMMARY OF THE INVENTION

Therefore, a novel rotor assembly is provided so as to obviate the foregoing shortcomings. The rotor assembly contains a number of polar anisotropic ring magnets sequentially stacked, a number of supporting rings within the stacked ring magnets, and an axle threading through the supporting rings. The ring magnets are of a same diameter and length. Each supporting ring contains three co-centric rings: an inner steel ring, a middle rubber ring, and an outer steel ring. The supporting rings are positioned with substantially equal spacing and with a gap away from each aperture of the stacked ring magnets, so that additional weight elements could be positioned and adhered within the gap.

With the present invention, the manufacturing effort in achieving a true circle for the rotor assembly's outer magnet is reduced. An appropriate number of ring magnets could be utilized and assembled for the motor assembly to build. The periodic positioning of a number of supporting rings could significantly reduce the weight of the motor assembly with much improved steadiness. Additionally, the middle rubber rings of the supporting rings provide a buffer mechanism for absorbing vibration and noise reduction.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
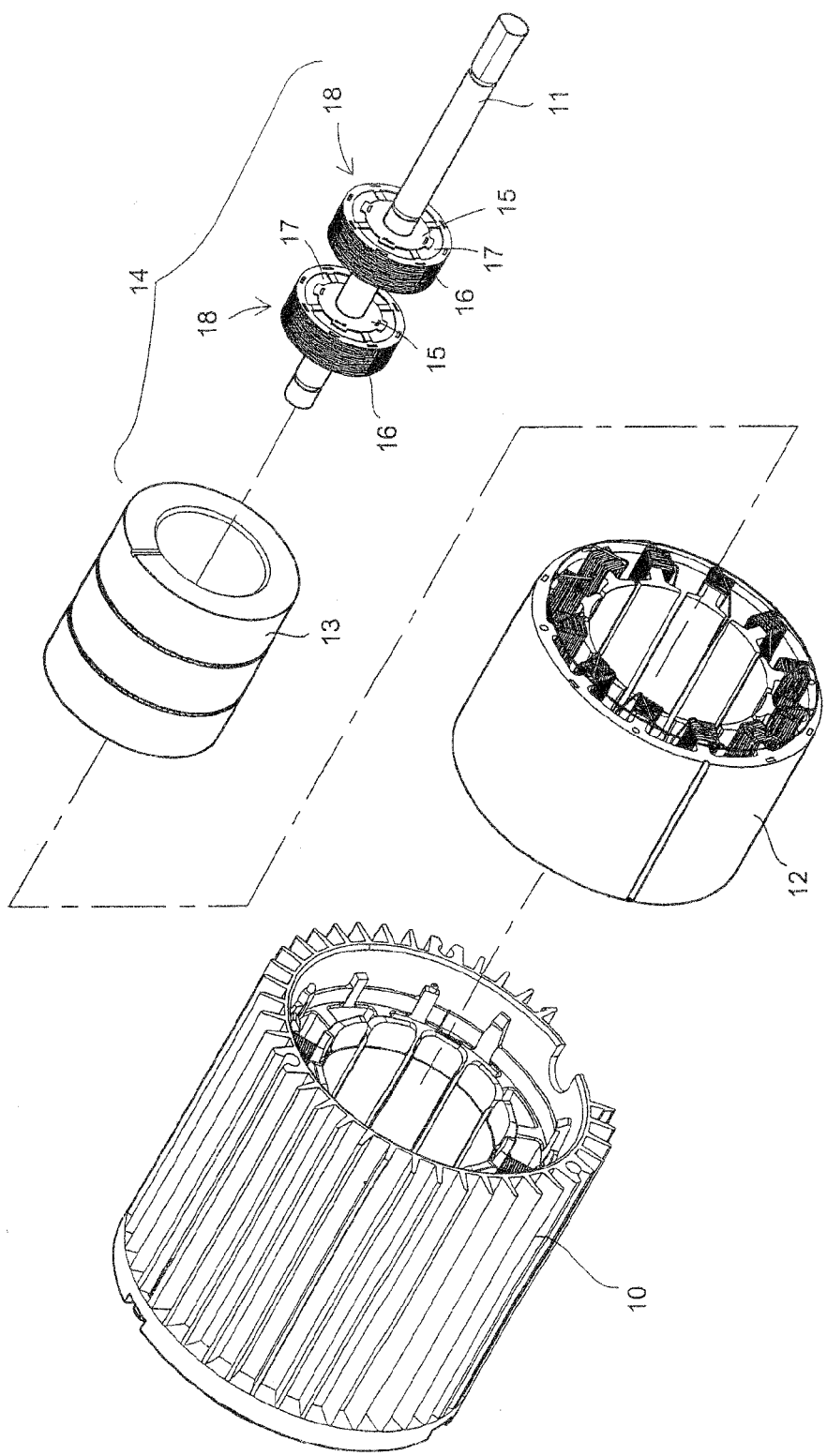
FIG. 1 is a perspective break-down diagram of a motor assembly according to an embodiment of the present invention.
Figure 2:
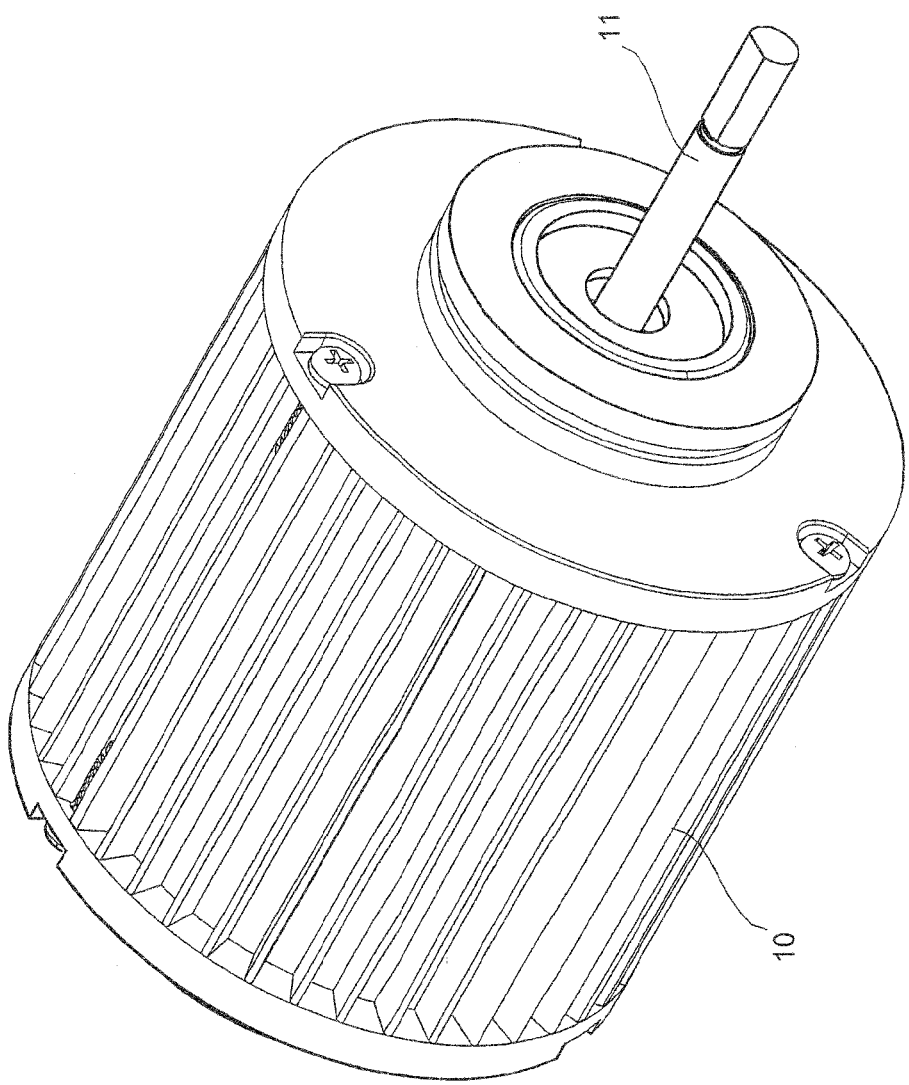
FIG. 2 is a perspective diagram showing the motor assembly of FIG. 1 after its assembly.
Figure 3:
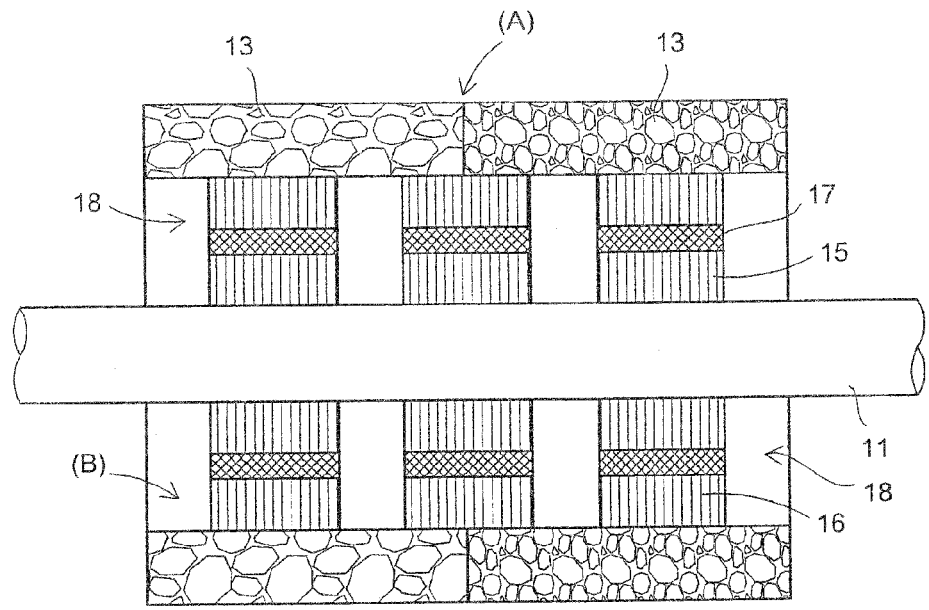
FIG. 3 is a schematic cross-sectional diagram showing the internal of a motor assembly according to an embodiment of the present invention.
Figure 4:
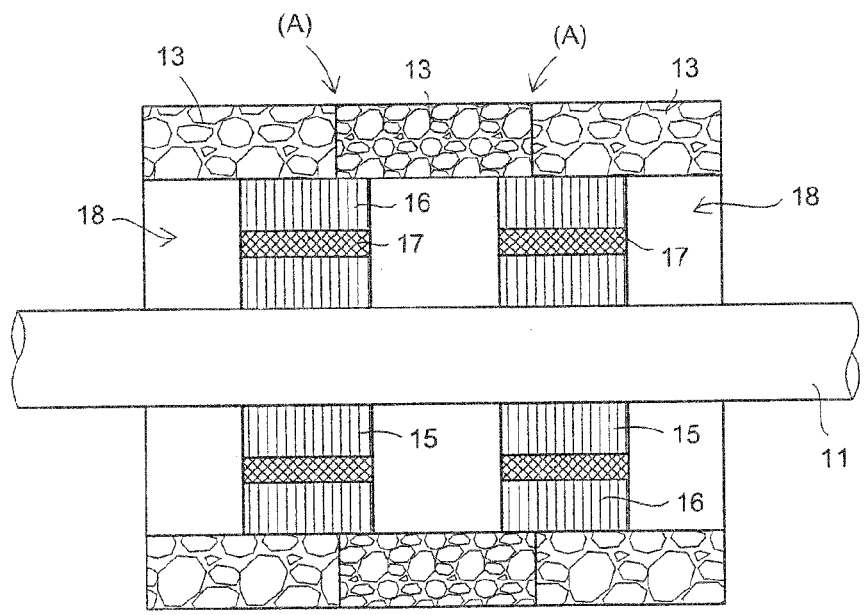
FIG. 4 is a schematic cross-sectional diagram showing the internal of a motor assembly according to another embodiment of the present invention.
Figure 5:
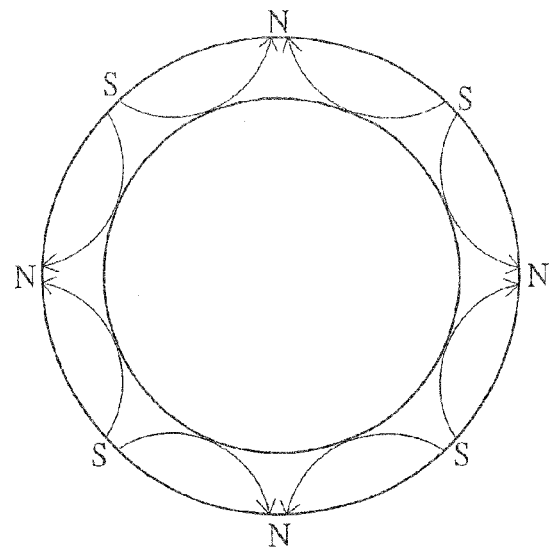
FIG. 5 is a schematic diagram showing the magnetic flux for the ring magnet of the present invention's rotor assembly.
Figure 6:
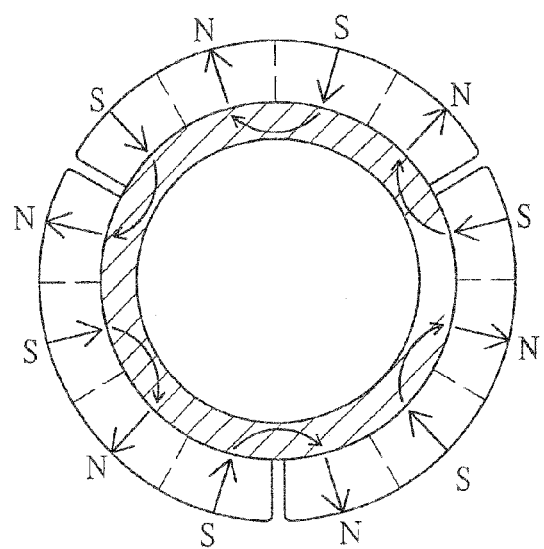
FIG. 6 is a schematic diagram showing the magnetic flux for a conventional rotor assembly.

As shown in FIGS. 1 to 5, a motor assembly according to an embodiment of the present invention contains a main member 10 and an axle 11 extended out of the main member 10, similar to a conventional motor. Within the main member 10, there is a stator 12 and a rotor assembly 14 within the stator 12. The rotor assembly 14 contains a set of polar anisotropic ring magnets 13, a number of supporting rings 18 within the ring magnets 13, and the axle 11 threading through the supporting rings 18. The ring magnets 13 have been magnetically processed as illustrated in FIG. 5. The ring magnets 13 are of the same diameter and length. Depending the total length required (i.e., the length of the stator 12), one or more ring magnets 13 are sequentially stacked and adhered together by strong adhesive with the help of some simple fixture. The set of ring magnets 13 as such jointly form a tubular object. For a small motor, there could be only one ring magnet 13. Each supporting ring 18 contains three co-centric rings: an inner steel ring 15, a middle rubber ring 17, and an outer steel ring 16. The supporting rings 18 are positioned with substantially equal spacing and with a gap (B) reserved between each end of the tubular object and an outmost supporting ring 18, so that additional weight elements (not shown) could be positioned and adhered within the gaps (B). As such, the axle 11 could be steadily held and the rotor assembly 14 could spin in a weight-balanced manner. Additionally, the middle rubber ring 17 of each supporting ring 18 helps reducing vibration and noise significantly. Preferably, a supporting ring 18 is positioned immediately adjacent to and across an interface (A) between each pair of neighboring ring magnets 13, so that the two ring magnets 13 are reliably supported by the supporting ring 18. The outer steel ring 16 of each supporting ring is directly adhered to the inner wall of the set of ring magnets 13 by strong adhesive.

The advantages of the present invention are as follows. The outer magnet of the rotor assembly 14 is implemented as a set of stacked ring magnets 13. The manufacturing effort in achieving a true circle for the outer magnet is as such reduced. Then, depending on the motor assembly to build and the length of the stator 12, an appropriate number of ring magnets 13 could be utilized and assembled. The periodic positioning of a number of supporting rings 18 could significantly reduce the weight of the motor assembly with much improved steadiness. Additionally, the middle rubber rings 17 of the supporting rings 18 provide a buffer mechanism for absorbing vibration and noise reduction.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

We claim:

1. A motor assembly, comprising:
a main member having a stator inside;
a rotor assembly inside said stator, said rotor assembly comprising a plurality of polar anisotropic ring magnets sequentially stacked and adhered by adhesive into a tubular object, a plurality of supporting rings within said-tubular object, and an axle threading through said supporting rings;
wherein said ring magnets are of a same diameter and length; each of said supporting rings comprises three co-centric rings: an inner steel ring, a middle rubber ring, and an outer steel ring; and a said supporting ring is positioned immediately adjacent to and across an interface between each pair of neighboring said ring magnets.

2. The motor assembly according to claim 1, wherein said supporting rings are positioned with substantially equal spacing and with a gap reserved between each end of said tubular object and a outmost said supporting ring.

3. The motor assembly according to claim 2, wherein at least a weight element is positioned and adhered within said gap.

* * * * *